US011987518B2

(12) United States Patent
Kladias et al.

(10) Patent No.: US 11,987,518 B2
(45) Date of Patent: May 21, 2024

(54) METHODS AND SYSTEMS FOR COOLING OPTICAL FIBER

(71) Applicant: CORNING INCORPORATED, Corning, NY (US)

(72) Inventors: Nikolaos Pantelis Kladias, Horseheads, NY (US); Chunfeng Zhou, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 273 days.

(21) Appl. No.: 17/345,503

(22) Filed: Jun. 11, 2021

(65) Prior Publication Data
US 2021/0387894 A1    Dec. 16, 2021

Related U.S. Application Data

(60) Provisional application No. 63/038,170, filed on Jun. 12, 2020.

(51) Int. Cl.
*C03B 37/027* (2006.01)
*C03B 37/03* (2006.01)

(52) U.S. Cl.
CPC ...... *C03B 37/02718* (2013.01); *C03B 37/032* (2013.01); *C03B 2205/55* (2013.01); *C03B 2205/60* (2013.01)

(58) Field of Classification Search
CPC .............................................. C03B 37/02718
See application file for complete search history.

(56) References Cited

U.S. PATENT DOCUMENTS

| 5,568,728 | A | 10/1996 | Sapsford |
| 6,705,126 | B2 | 3/2004 | Paek et al. |
| 6,715,323 | B1 * | 4/2004 | Roba ................. C03B 37/02718 65/513 |
| 2017/0073265 | A1 * | 3/2017 | Bookbinder ...... C03B 37/02727 |
| 2021/0179477 | A1 | 6/2021 | Dunwoody et al. |

FOREIGN PATENT DOCUMENTS

| DE | 3818266 A1 * | 12/1989 | |
| EP | 579388 A1 * | 1/1994 | ....... C03B 37/02718 |
| EP | 3347314 A1 | 7/2018 | |
| JP | 2000-072469 A | 3/2000 | |

OTHER PUBLICATIONS

Translation of DE 3818266A1 (Year: 1989).*

* cited by examiner

*Primary Examiner* — Cynthia Szewczyk
(74) *Attorney, Agent, or Firm* — Yiqun Zhao

(57) ABSTRACT

A cooling device system for cooling optical fiber includes a plurality of bodies (202), each body having a top surface (210) and an opposing bottom surface (212); an opening (204) within each of the plurality of bodies extending from the top surface through the body to the bottom surface, wherein the opening is configured to pass an optical fiber (10) through the body; and one or more air outlets (208) within the body configured to direct air to contact the optical fiber as it passes through the opening, wherein the air flowing out of the one or more openings has an average velocity of about 20 m/s to about 350 m/s.

20 Claims, 5 Drawing Sheets

METHODS AND SYSTEMS FOR COOLING OPTICAL FIBER

CROSS-REFERENCE TO RELATED APPLICATIONS

This application claims the benefit of priority under 35 U.S.C. § 119 of U.S. Provisional Application Ser. No. 63/038,170 filed on Jun. 12, 2020, the content of which is relied upon and incorporated herein by reference in its entirety.

BACKGROUND

Field

The present specification generally relates to apparatuses and methods for processing optical fibers, and more particularly, to apparatuses and methods for cooling an optical fiber in a draw process.

Technical Background

Conventional manufacturing processes for producing optical fibers generally include drawing an optical fiber downward from a draw furnace and along a linear pathway through multiple stages of production in an optical fiber draw tower. Once drawn from the draw furnace, the optical fiber may be cooled in a regulated manner to achieve desired fiber properties.

To meet consumer demand for optical fiber, it is desirable to increase optical fiber production within existing optical fiber draw towers. To increase optical fiber production, the rate at which the optical fiber is drawn is generally increased. However, increased draw rates may lead to increased temperatures of the optical fiber at the various stages of production, which may lead to decreased quality of the optical fiber.

Accordingly, a need exists for improved methods and systems for cooling an optical fiber in a draw process.

SUMMARY

In one embodiment, a cooling device (130) includes a plurality of bodies (202), each body having a top surface (210) and an opposing bottom surface (212); an opening (204) within each of the plurality of bodies extending from the top surface through the body to the bottom surface, wherein the opening is configured to pass an optical fiber (10) through the body; and one or more air outlets (208) within the body configured to direct air to contact the optical fiber as it passes through the opening, wherein the air flowing out of the one or more openings has an average velocity of about 20 m/s to about 350 m/s.

In another embodiment, a system for processing optical fiber includes: a draw furnace (110); a fiber conveyance pathway (102) extending between an upstream end positioned at the draw furnace and a downstream end positioned opposite the upstream end, wherein the optical fiber (12) is conveyed along the fiber conveyance pathway from the upstream end to the downstream end in a fiber conveyance direction; and a cooling device (130) surrounding the fiber conveyance pathway downstream from the draw furnace, the cooling device comprising: a plurality of bodies (202), each body having a top surface (210) and an opposing bottom surface (212), an opening (204) within each of the plurality of bodies extending from the top surface through the body to the bottom surface, wherein the opening is configured to pass an optical fiber (10) through the body, and one or more air outlets (208) within the body configured to direct air to contact the optical fiber as it passes through the opening, wherein the air flowing out of the one or more openings has an average velocity of about 20 m/s to 350 m/s.

In another embodiment, a method for cooling an optical fiber includes: drawing an optical fiber (10) through a draw furnace (110); and conveying the optical fiber through a cooling device (130), the cooling device having a first inlet and a first outlet positioned opposite the first inlet, the optical fiber entering the first cooling device at the first inlet and exiting the first cooling device at the first outlet, the optical fiber having a first temperature at the first inlet, and a second temperature at the first outlet that is lower than the first temperature, wherein the cooling device comprises: a plurality of bodies (202) each body having a top surface (210) and an opposing bottom surface (212), an opening (204) within each of the plurality of bodies extending from the top surface through the body to the bottom surface, wherein the opening is configured to pass an optical fiber (10) through the body, and one or more air outlets (208) within the body configured to direct air to contact the optical fiber as it passes through the opening, wherein the air flowing out of the one or more openings has an average velocity of about 20 m/s to 350 m/s.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
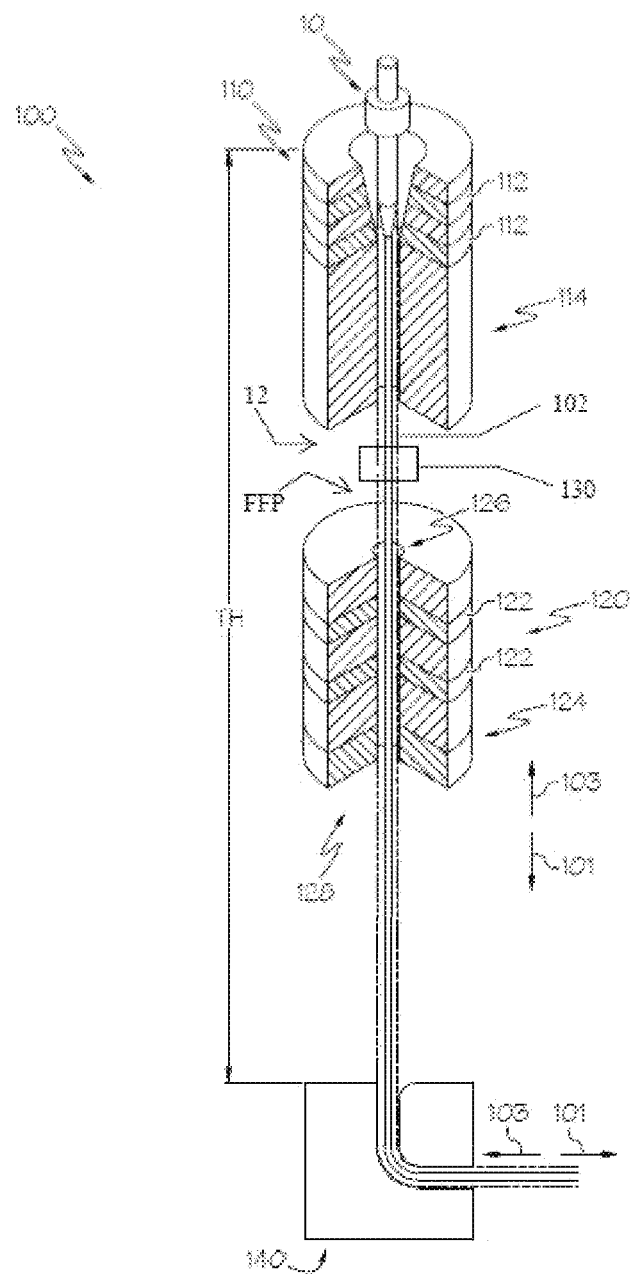
FIG. 1 schematically depicts an optical fiber production system, according to one or more embodiments described herein.

Optical fiber manufacturing processes may generally include drawing optical fiber downward from a draw furnace in an optical fiber draw tower. From the draw furnace, the optical fiber is drawn along a fiber conveyance pathway through one or more cooling devices that cool the optical fiber in a regulated manner to achieve desired fiber properties. For example, as the optical fiber controllably cools, a diameter of the optical fiber reduces to a finished diameter at a forming point. Additionally, the structure of the optical fiber changes as the optical fiber cools.

To meet consumer demand for optical fiber, it is desirable to increase the rate at which optical fiber is drawn, thereby increasing optical fiber production. However, increasing the rate at which the optical fiber is drawn reduces the time that the optical fiber resides in the one or more cooling devices that controllably cool the optical fiber. By reducing the time the optical fiber resides in the one or more cooling devices, a fictive temperature of the optical fiber may be increased and the optical fiber may exhibit higher attenuation.

Reference will now be made in detail to embodiments of methods and systems for producing optical fibers, examples of which are illustrated in the accompanying drawings. Whenever possible, the same reference numerals will be used throughout the drawings to refer to the same or like parts.

Referring initially to FIG. 1, an optical fiber production system 100 is schematically depicted. The optical fiber production system 100 generally includes a draw furnace 110, a muffle 114 in communication with the draw furnace 110, a second cooling device 120, and a turning device 140. In embodiments, the optical fiber production system 100 may be positioned within a draw tower having a height TH that generally corresponds to a distance between the draw furnace 110 and the turning device 140. In some embodiments, the optical fiber production system 100 may include one or more devices that further process the optical fiber downstream of the turning device 140, such as a fiber coating device and the like.

As depicted in FIG. 1, the optical fiber production system 100 generally defines a fiber conveyance pathway 102 that extends from the draw furnace 110 through the turning device 140. As described in greater detail herein, an optical fiber 12 travels along the fiber conveyance pathway 102 in a fiber conveyance direction 101. As referred to herein, the terms "downstream" and "downward" generally refer to the relative position of components of the optical fiber production system 100 in the fiber conveyance direction 101 along the fiber conveyance pathway 102. The terms "upstream" and "upward" refer to the relative position of components of the optical fiber production system 100 in a counter-conveyance direction 103 that is opposite the fiber conveyance direction 101 along the fiber conveyance pathway 102. By way of example, turning device 140 is downstream of second cooling device 120, which is downstream of draw furnace 110. Similarly, draw furnace 110 is upstream of second cooling device 120, which is upstream of turning device 140. In embodiments, the fiber conveyance pathway 102 generally extends between an upstream end at the draw furnace 110 and a downstream end positioned opposite the upstream end. Between the draw furnace 110 and the turning device 140, the fiber conveyance pathway 102 generally extends in a vertical direction in which the draw furnace 110 is positioned above the turning device 140.

As depicted in FIG. 1, an optical fiber preform 10 is placed in the draw furnace 110. The optical fiber preform 10 may be constructed of any glass or material suitable for the manufacture of optical fibers such as silica glass or the like. In some embodiments, the optical fiber preform 10 may include a homogenous composition throughout the optical fiber preform 10. In some embodiments, the optical fiber preform 10 may include regions having different compositions.

The draw furnace 110 includes one or more heating elements 112 that heat the optical fiber preform 10 such that the optical fiber 12 may be drawn from the optical fiber preform 10. In embodiments, the heating elements 112 generally include any elements suitable for generating thermal energy, for example and without limitation, induction coils or the like. A section view of the draw furnace 110 is depicted in FIG. 1, however, it should be understood that in embodiments, the draw furnace 110 may define a shape surrounding the optical fiber preform 10. In embodiments, the draw furnace 110 is oriented in the vertical direction, such that a downstream end of the draw furnace 110 is positioned below the optical fiber preform 10. The optical fiber 12 may be drawn from the optical fiber preform 10 as the optical fiber preform 10 softens due to heating by the draw furnace 110. By orienting the draw furnace 110 in the vertical direction, as the optical fiber preform 10 softens, portions of the optical fiber preform 10 may yield under their own weight to form the optical fiber 12, and the optical fiber 12 may be drawn along the fiber conveyance pathway 102. In some embodiments, the optical fiber production system 100 may include a fiber collection unit positioned at the downstream end of the fiber conveyance pathway 102, and the fiber collection unit may apply tension to the optical fiber 12 to draw the optical fiber 12 along the fiber conveyance pathway 102.

In embodiments, once the optical fiber 12 exits the draw furnace 110, the optical fiber 12 enters the muffle 114. A section view of the muffle 114 is depicted in FIG. 1, however like the draw furnace 110, it should be understood that in embodiments, the muffle 114 may define a shape surrounding the fiber conveyance pathway 102. In embodiments, the muffle 114 is in communication with the draw furnace 110 and may be coupled to the downstream end of the draw furnace 110.

In embodiments, the muffle 114 includes a gas environment that is similar to or the same as the draw furnace 110. For example, in some embodiments, an inert gas or gas mixture, such as helium gas or a helium gas mixture is utilized within the draw furnace 110. In some embodiments, other inert gases or other inert gas mixtures including and without limitation, nitrogen and/or argon, may be utilized within the draw furnace 110. The muffle 114 may include the same inert gas environment as the draw furnace 110 within the muffle 114.

Without being bound by theory, helium gas has a relatively high thermal conductivity, and may accordingly facilitate a higher rate of heat transfer from the optical fiber 12 as compared to ambient air or other gas mixtures. Accordingly, in embodiments in which the draw furnace 110 contains a gas environment including helium or a helium mixture, the same helium or helium mixture gas environment within muffle 114 may facilitate comparatively efficient cooling of the optical fiber 12 within the muffle 114.

Downstream from the muffle 14, the optical fiber enters a cooling device 130. In the embodiment depicted in FIG. 1, the cooling device 130 is spaced apart from the muffle 114 and the draw furnace 110 along the fiber conveyance pathway 102. Embodiments of the cooling device 130 described herein cool the optical fiber at a rate of about 100,000 deg. Celsius/second.

Figure 2:
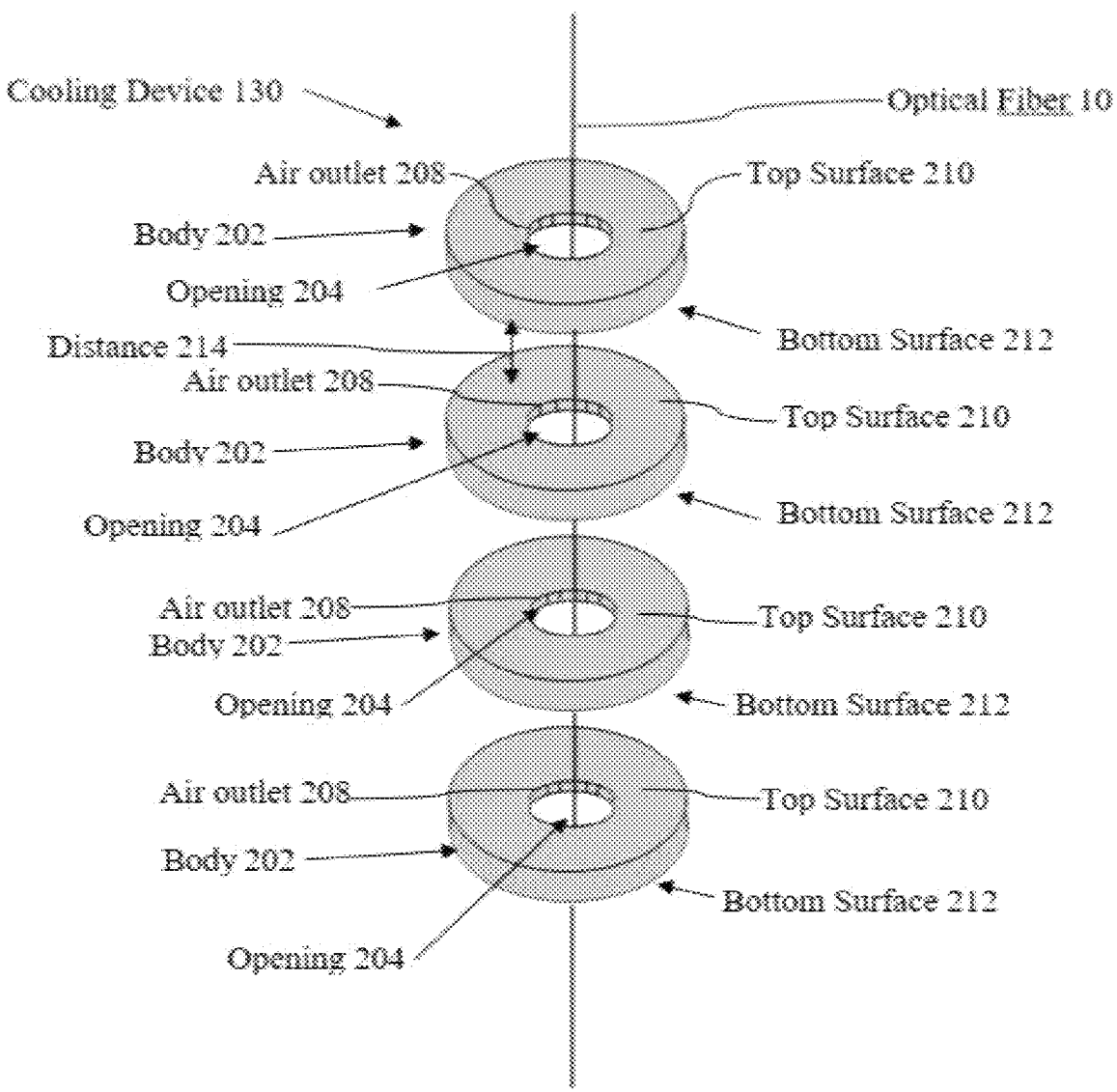
FIG. 2 schematically depicts a cooling device of the optical fiber protection system of FIG. 1, according to one or more embodiments shown and described herein.

As depicted in FIG. 2, the cooling device 130 comprises a plurality of bodies 202. In some embodiments, the cooling device has a length of about 10 inches to about 60 inches. In some embodiments, the cooling device has a length of about 20 inches to about 60 inches, or about 30 inches to about 60 inches, or about 40 inches to about 60 inches, or about 50 inches to about 60 inches.

In some embodiments, as depicted in FIG. 2, the cooling device 130 comprises 4 bodies 202. The cooling device 130 may contain more or less bodies 202 than depicted in the exemplary embodiment, for example 1, 2, 3, 5, or 6 bodies 202. Each body 202 has a top surface 210 and an opposing bottom surface 212. The bottom surface faces the fiber conveyance direction 101. The top surface 210 faces the counter-conveyance direction 103. In some embodiments, a distance 214 from a bottom surface 210 of a body 202 to a top surface 210 of an adjacent body 202 is about 2 inches to about 10 inches. In some embodiments, the distance 214 is about 4 inches to about 10 inches, or about 6 inches to about 10 inches, or about 8 inches to about 10 inches. In some embodiments, the distance 214 is about 2 inches to about 8 inches, or about 2 inches to about 6 inches, or about 2 inches to about 4 inches.

Each body 202 has an opening 204 extending from the top surface 210 through the body 202 to the bottom surface 212. The optical fiber 12 passes through the opening 204. In some embodiments, the opening 204 has a diameter of about 2 mm to about 100 mm. In some embodiments, the opening 204 has a diameter of about 10 mm to about 100 mm, or about 20 mm to about 100 mm, or about 30 mm to about 100 mm, or about 40 mm to about 100 mm, or about 50 mm to about 100 mm, or about 60 mm to about 100 mm, or about 70 mm to about 100 mm, or about 80 mm to about 100 mm, or about 90 mm to about 100 mm. In some embodiments, the opening 204 has a diameter of about 2 mm to about 90 mm. In some embodiments, the opening 204 has a diameter of about 2 mm to about 80 mm. In some embodiments, the opening 204 has a diameter of about 2 mm to about 70 mm. In some embodiments, the opening 204 has a diameter of about 2 mm to about 60 mm. In some embodiments, the opening 204 has a diameter of about 2 mm to about 40 mm. In some embodiments, the opening 204 has a diameter of about 2 mm to about 20 mm. In some embodiments, the opening 204 has a diameter of about 2 mm to about 10 mm.

Figure 3A:
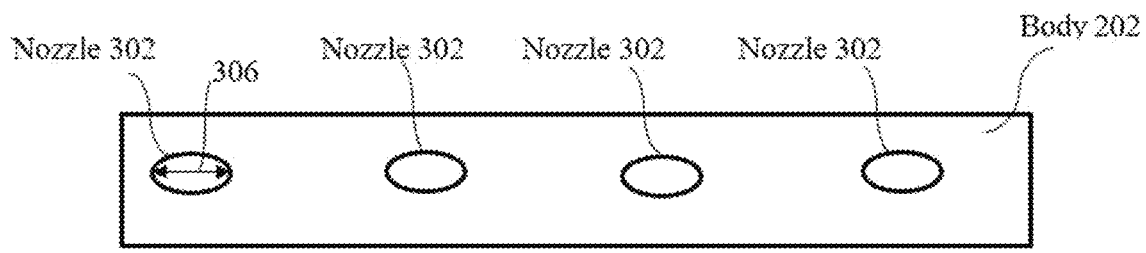
FIG. 3A-3B schematically depicts a cross-sectional view of the cooling of the optical fiber protection system of FIG. 1, according to one or more embodiments described herein.

One or more air outlets 208 within the body 202 direct air toward the optical fiber 10 passing through the opening 204 to cool the optical fiber 10. The one or more air outlets 208 direct air toward the optical fiber 10 at an average velocity of about 20 m/s to about 350 m/s. In some embodiments, air is directed toward the optical fiber 10 at an average velocity of about 50 m/s to about 350 m/s, or about 50 m/s to about 350 m/s, or about 100 m/s to about 350 m/s, or about 150 m/s to about 350 m/s, or about 200 m/s to about 350 m/s, or about 250 m/s to about 350 m/s, or about 300 m/s to about 350 m/s. One or more air inlet tubes are fluidly couple to the air outlets 208 to supply air. In some embodiments, the air directed toward the optical fiber is at room temperature (i.e. about 25 degrees Celsius). In some embodiments, the air directed toward the optical fiber is cooled to less than room temperature prior to directing the air toward the optical fiber. The air may be cooled by passing the air through a heat exchanger or through a vortex cooler tuber In some embodiments, as depicted in FIG. 3A, the one or more air outlets 208 are a plurality of nozzles 302 directing air toward the optical fiber 10. In some embodiments, the plurality of nozzles is 2 to 50 nozzles, preferably 3 to 20 nozzles, more preferably 3 to 12 nozzles. In some embodiments, each nozzle is positioned equidistant from an adjacent nozzle as measured from a center of one nozzle to a center of an adjacent nozzle. In some embodiments, each of the plurality of nozzles has a diameter 306 of about 100 micron to about 5 mm. In some embodiments, each nozzle 302 provides a volumetric flow rate of air from about 5 slpm to about 8 slpm.

Figure 3B:
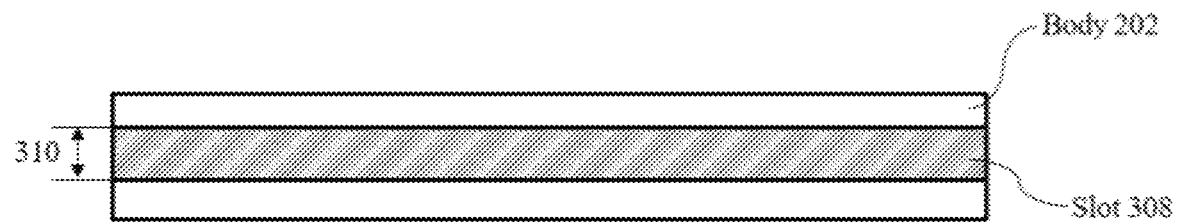

In some embodiments, as depicted in FIG. 3B, the one or more air outlets 208 is single slot 308 directing air toward the optical fiber 10. In some embodiments, the slot 308 has a width 310 of about 50 microns to about 2 mm. In some embodiments, the slot 308 has a width 310 of about 100 microns to about 2 mm, or about 500 microns to about 2 mm, or about 1 mm microns to about 2 mm.

Returning to FIG. 1, downstream from the cooling device 130, the optical fiber 12 enters a slow cooling device, referred to herein as the second cooling device 120. A section view of the second cooling device 120 is depicted in FIG. 1, however, it should be understood that in embodiments the second cooling device 120 may define a shape that surrounds the fiber conveyance pathway 102. In the embodiment depicted in FIG. 1, the second cooling device 120 is spaced apart from the muffle 114 and the draw furnace 110 along the fiber conveyance pathway 102.

In embodiments, the second cooling device 120 extends between a second inlet 126 and a second outlet 128 positioned opposite the second inlet 126. The optical fiber 12 generally enters the second cooling device 120 at the second inlet 126 and exits the second cooling device 120 at the second outlet 128. The second cooling device 120 includes one or more second cooling device heating elements 122 that apply heat to the optical fiber 12 as it passes through the second cooling device 120. In embodiments, the one or more second cooling device heating elements 122 generally include any elements suitable for generating thermal energy, for example and without limitation, induction coils or the like. The second cooling device 120 may assist in reducing the cooling rate of the optical fiber 12 while the optical fiber 12 is in a glass transition region. Reducing the cooling rate of the optical fiber 12 in the glass transition region may generally assist in allowing the glass network of the optical fiber 12 to rearrange in a manner that reduces attenuation resulting from Rayleigh scattering when the optical fiber 12 is utilized as an optical waveguide.

In some embodiments, the optical fiber production system 100 further includes an airflow manifold 124 that provides clean air (i.e., ambient air not impacted by the fiber production process) to the second cooling device 120. The airflow manifold 124 may be positioned downstream of and may be in fluid communication with the second cooling device 120.

The turning device 140 is positioned on the fiber conveyance pathway 102 downstream of the second cooling device 120, and in embodiments, the turning device 140 changes the fiber conveyance direction 101. For example, in embodiments, the turning device 140 includes one or more fluid bearings or the like that redirects the optical fiber 12, changing the fiber conveyance direction 101. Upstream of the turning device 140, the fiber conveyance direction 101 generally extends in the vertical direction and the turning device 140 directs the optical fiber 12 in a direction that is transverse to or at an angle to the vertical direction in the embodiment depicted in FIG. 1. In the embodiments in which the turning device 140 includes one or more fluid bearings, the turning device 140 redirects the optical fiber 12 by impinging fluid (e.g., nitrogen, argon, helium, air, or the like) on the optical fiber 12. In some embodiments, the cooling device 130 is positioned between the second cooling device 120 and the turning device 140.

Figure 4:
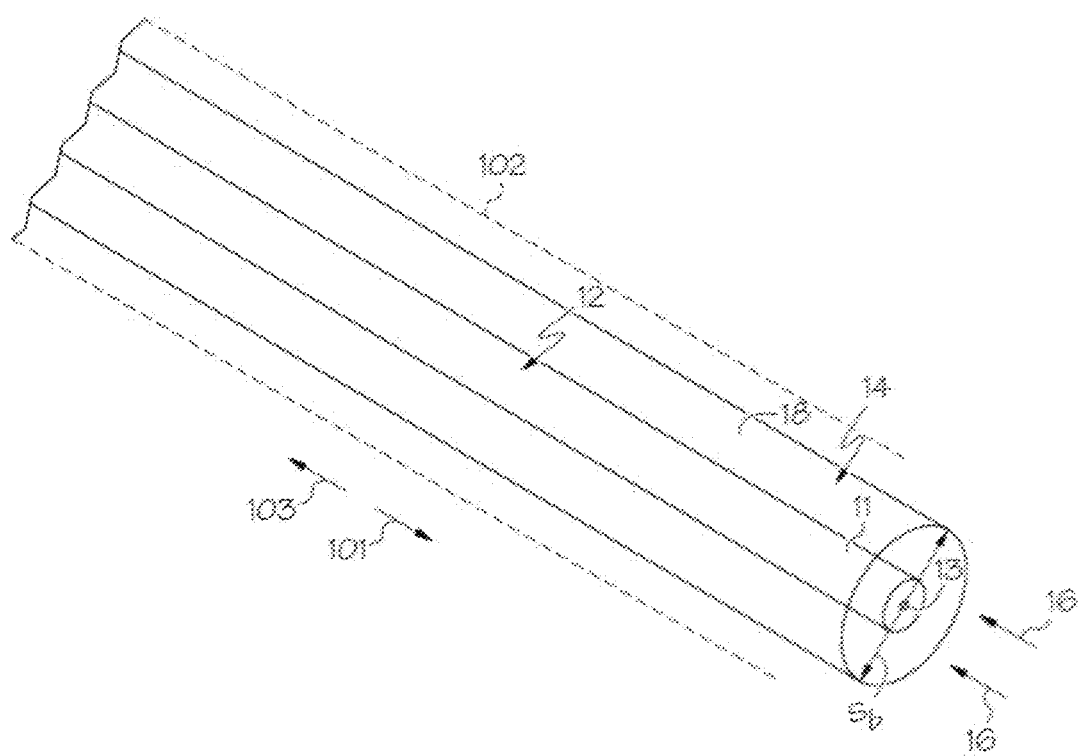
FIG. 4 schematically depicts an enlarged perspective view of an optical fiber within the optical fiber production system of FIG. 1, according to one or more embodiments described herein.

Referring to FIG. 4, the cooling device 130 directs the air 16 toward the optical fiber 12 such that the air 16 reduces a portion of a gas boundary layer 14 surrounding the optical fiber 12. As the optical fiber 12 moves along the fiber conveyance pathway 102, the gas boundary layer 14 is generated around the optical fiber 12 and comprises gas flowing primarily in the fiber conveyance direction 101. The gas boundary layer 14 extends radially from the optical fiber 12, terminating at a gas layer interface 18 and defining a gas boundary layer span $S_b$. Without being bound by theory, the gas boundary layer 14 is formed from drag generated by motion of the optical fiber 12 in the fiber conveyance direction 101. In embodiments, the gas boundary layer 14 generally provides thermal insulation to the optical fiber 12, thereby maintaining the optical fiber 12 at a relatively high temperature.

The air 16 separates at least a portion of the gas boundary layer 14 from the optical fiber 12. By separating at least a portion of the gas boundary layer 14 from the optical fiber 12, the air 16 may assist in dissipating heat from the optical fiber 12. For example, by separating at least a portion of the gas boundary layer 14 from the optical fiber 12, the thermal insulation provided by the gas boundary layer 14 may be reduced or removed, such that thermal energy of the optical fiber 12 may be dissipated more readily as compared to optical fiber 12 including an undisturbed gas boundary layer 14.

In some embodiments, as the air 16 is directed toward the optical fiber 12, the air 16 compresses the gas boundary layer, reducing the gas boundary layer span $S_b$. By reducing the gas boundary layer span $S_b$, the thermal insulation provided by the gas boundary layer 14 may be reduced, such that thermal energy of the optical fiber 12 may be dissipated more readily as compared to optical fiber 12 including an undisturbed gas boundary layer 14.

Referring to FIG. 4, in embodiments, the optical fiber 12 includes a cladding 11 positioned around a core 13 of the optical fiber 12. In embodiments, the cladding 11 comprises a refractive index that is different than the core of the optical fiber. For example, in embodiments, the core 13 may have a higher refractive index than the cladding 11, and may assist in restricting light from passing out of the core 13, for example, when the optical fiber 12 is used as an optical waveguide.

Figure 7:
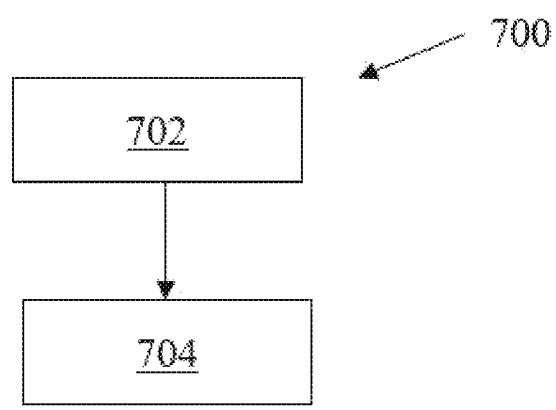
FIG. 7 is a flowchart of a method of cooling optical fiber, according to one or more embodiments described herein.

FIG. 7 is a flowchart of a method of cooling optical fiber. The method 700 begins at 702 by drawing an optical fiber through a draw furnace. Embodiments of the optical fiber and the draw furnace are described above. Next at 704, the optical fiber is conveyed through a cooling device 130. Embodiments of the cooling device 130 used in the method 600 are described above with reference to FIG. 2 and FIG. 3A-3B. The optical fiber enters the cooling device 130 at a first inlet and exits the cooling device 130 at the first outlet. The optical fiber has a first temperature at the first inlet, and a second temperature at the first outlet that is lower than the first temperature. In some embodiments, the cooling device 130 cools the optical fiber above the forming point of the optical fiber, such that the forming point may be moved upward (upstream) along the optical fiber draw tower, allowing more space along optical fiber draw tower for additional cooling below the forming point. Additional cooling of the optical fiber below the forming point can improve optical fiber attenuation.

At the fiber formation point FFP, the optical fiber 12 is generally at a forming point temperature Tfp. The forming point temperature Tfp is a temperature of the optical fiber 12 at which a viscosity of the cladding 11 (FIG. 4) of the optical fiber 12 is such that the diameter of the optical fiber 12 does not generally change as the fiber is cooled. In embodiments, the viscosity of the cladding 11 (FIG. 4) at the forming point temperature Tfp is about $10^{8.2}$ Poise. In some embodiments, the viscosity of the cladding 11 (FIG. 4) at the forming point temperature Tfp is between $10^{8.20}$ Poise and $10^{8.30}$ Poise, inclusive of the endpoints. In some embodiments, the viscosity of the cladding 11 (FIG. 4) at the forming point temperature Tfp is between $10^{8.23}$ Poise and $10^{8.24}$ Poise, inclusive of the endpoints. Different optical fibers 12 (e.g. optical fibers differing in composition or dopant concentration) may have different forming point temperatures Tfp (i.e., different temperatures at which the viscosity of the cladding 11 is at about $10^{8.2}$ Poise). For example, for some optical fiber compositions, the forming point temperature Tfp is about 1550° C. For some optical fiber compositions, the forming point temperature Tfp is about 1620° C. In embodiments, as the optical fiber 12 moves through the cooling device 130, the viscosity of the cladding 11 (FIG. 4) of the optical fiber 12 may change. For example, in some embodiments, the cladding 11 (FIG. 4) of the optical fiber 12 has a viscosity between $10^{8.2}$ Poise and $10^{10.7}$ Poise at the outlet of the cooling device 130.

In some embodiments, the first temperature of the optical fiber 12 at the inlet of the first cooling device 130 is more than 150° C. greater than the forming point temperature Tfp. In some embodiments, the first temperature of the optical fiber 12 at the inlet is characterized by the following equation in which T1 is the first temperature and Tfp is the forming point temperature:

$$Tfp+150° C.<T1<Tfp+500° C.$$

In embodiments, the second temperature of the optical fiber 12 at the outlet of the cooling device 130 can also be expressed with relation to the forming point temperature Tfp. In some embodiments, the second temperature of the optical fiber 12 at the outlet is characterized by the following equation in which T2 is the second temperature and Tfp is the forming point temperature:

$$Tfp-100° C.<T2$$

In some embodiments, the second temperature of the optical fiber 12 at the outlet is characterized by the following equation in which T2 is the second temperature and Tfp is the forming point temperature:

$$Tfp-100° C.<T2<Tfp+200° C.$$

While the diameter of the optical fiber 12 is generally constant downstream of the fiber formation point FFP, in some embodiments, the diameter of the optical fiber 12 changes as the optical fiber 12 moves through the cooling device 130. For example, in some embodiments the optical fiber 12 has a first diameter at the inlet of the cooling device 130, and a second diameter at the outlet of the cooling device 130.

Figure 5:
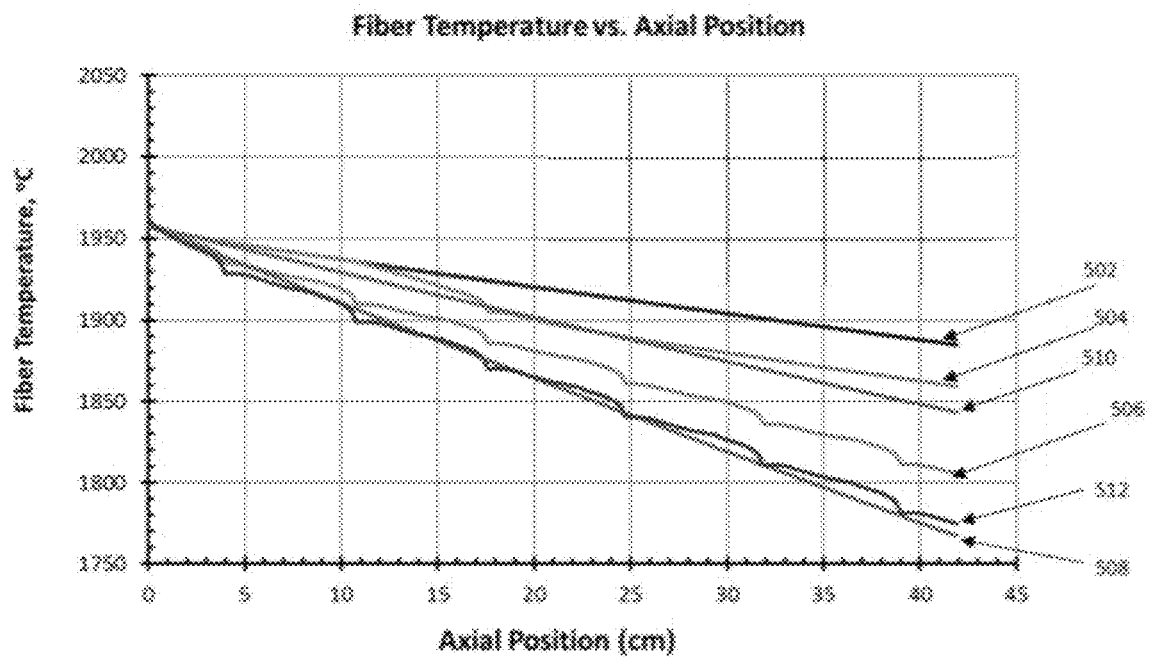
FIG. 5 depicts a plot of fiber temperature as a function of axial position for several methods of cooling, according to one or more embodiments described herein.

FIG. 5 depicts a plot 500 of fiber temperature as a function of axial position for several methods of cooling. In all cases depicted in FIG. 5, the optical fiber cooling is over a length of 42 cm and the fiber initial temperature was 1960 degrees Celsius. Line 502 shows fiber temperature as a function of axial position with cooling in air. Line 504 shows fiber temperature as a function of axial position using the cooling device 130, as described herein, having one nozzle with air flow of 30 slpm. Line 506 shows fiber temperature as a function of axial position using the cooling device 130, as described herein, having six nozzles with air flow of 30 slpm per nozzle. Line 508 shows fiber temperature as a function of axial position using a cooling tube with helium at a flow rate of 150 slpm. Line 510 shows fiber temperature as a function of axial position using a cooling tube with nitrogen at a flow rate of 150 slpm. Line 512 shows fiber temperature as a function of axial position using the cooling device 130, as described herein, having six nozzles with air flow of 45 slpm per body.

FIG. 5 shows that cooling the optical fiber with six nozzles with an air flow of 30 slpm each (Line 506) is more effective than cooling the fiber in a quench tube operating with 150 slpm of nitrogen (Line 510). FIG. 5 also shows that 45 slpm air flow rate in each of the six nozzles (Line 512) can achieve a similar cooling rate as in a quench tube operating with 150 slpm of helium (Line 508). Since the cost of helium is significant, the cooling device 130 described herein can achieve the same cooling rate at a much lower cost.

Figure 6:
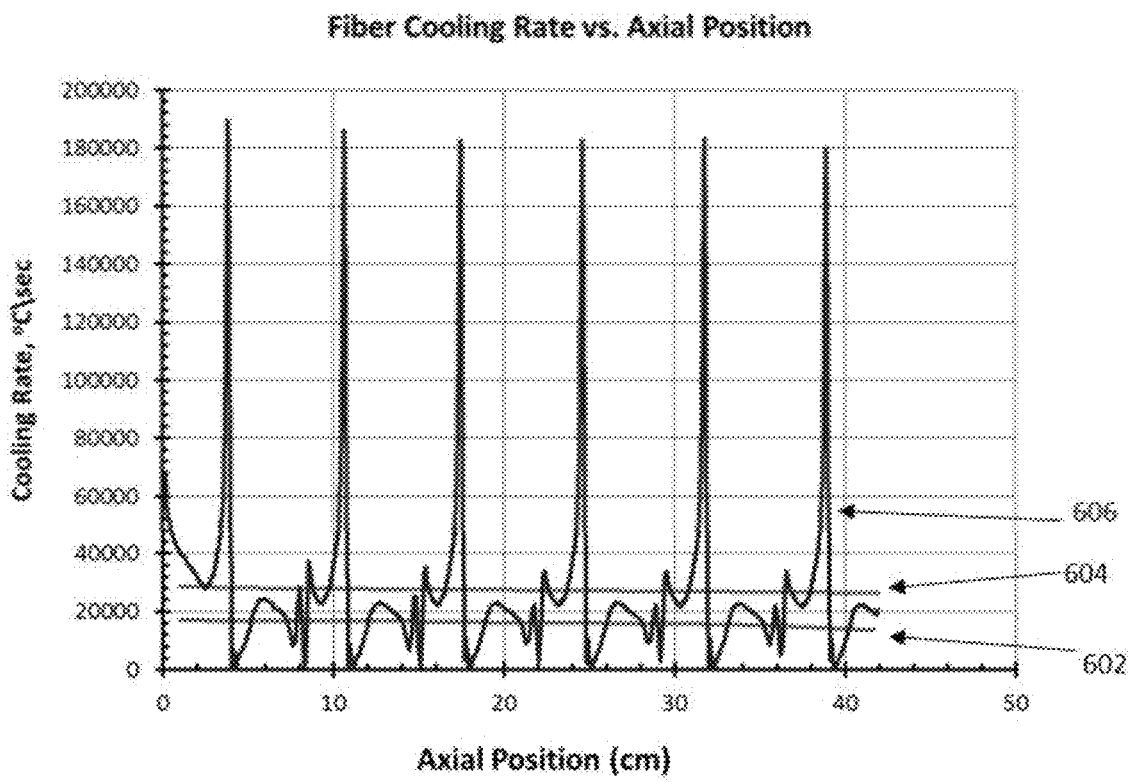
FIG. 6. depicts a plot of fiber cooling rate as a function of axial position for several methods of cooling, according to one or more embodiments described herein.

FIG. 6. depicts a plot 600 of fiber cooling rate as a function of axial position for several methods of cooling. Line 602 shows fiber cooling rate as a function of axial position using a cooling tube with nitrogen at a flow rate of 150 slpm. Line 604 shows fiber cooling rate as a function of axial position using a cooling tube with helium at a flow rate of 150 slpm. Line 606 shows fiber temperature as a function of axial position using the cooling device 130, as described herein, having six nozzles with air flow of 45 slpm per nozzle.

FIG. 6 shows that cooling the optical fiber with six nozzles with an air flow of 30 slpm each (Line 606) improves the cooling rate of the fiber versus cooling the fiber in a quench tube operating with 150 slpm of nitrogen (Line 602) or 150 slpm of helium (Line 604).

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A cooling device, comprising:
a plurality of bodies, each body having a top surface and an opposing bottom surface;
an opening within each of the plurality of bodies extending from the top surface through the body to the bottom surface, wherein the opening is configured to pass an optical fiber through the body along a fiber conveyance pathway;
one or more air inlets within the body; and
one or more air outlets within the body configured to direct air to contact the optical fiber as it passes through the opening, wherein the air flowing out of the one or more openings has an average velocity of about 20 m/s to about 350 m/s, and wherein the one or more air inlets are fluidly coupled to the air outlets via one or more slots that extend through the body oriented orthogonal to the fiber conveyance pathway.

2. The cooling device of claim 1, wherein the air flowing out of the one or more openings has an average velocity of about 50 m/s to about 350 m/s.

3. The cooling device of claim 1, wherein the opening has a diameter of about 2 mm to about 100 mm.

4. The cooling device of claim 1, wherein the one or more air outlets is a plurality of nozzles.

5. The cooling device of claim 4, wherein the plurality of nozzles is 2 to 50 nozzles.

6. The cooling device of claim 4, wherein each of the plurality of nozzles has a diameter of about 100 micron to about 5 mm.

7. The cooling device of claim 1, wherein each body is positioned a distance of about 2 inches to about 10 inches apart from an adjacent body.

8. The cooling device of claim 1, wherein the one or more air outlets is a singular slot having a width of about 50 microns to about 2 mm.

9. The cooling device of claim 1, wherein the one or more air outlets are configured to direct the air from the one or more air outlets in a direction orthogonal to the fiber conveyance pathway.

10. A system for processing an optical fiber, the system comprising:
a draw furnace;
a fiber conveyance pathway extending between an upstream end positioned at the draw furnace and a downstream end positioned opposite the upstream end, wherein the optical fiber is conveyed along the fiber conveyance pathway from the upstream end to the downstream end in a fiber conveyance direction; and
a cooling device surrounding the fiber conveyance pathway downstream from the draw furnace, the cooling device comprising:
a plurality of bodies, each body having a top surface and an opposing bottom surface,
an opening within each of the plurality of bodies extending from the top surface through the body to the bottom surface, wherein the opening is configured to pass the optical fiber through the body along the fiber conveyance pathway,
one or more air inlets within the body, and
one or more air outlets within the body configured to direct air to contact the optical fiber as it passes through the opening, wherein the air flowing out of the one or more openings has an average velocity of about 20 m/s to 350 m/s, and wherein the one or more air inlets are fluidly coupled to the one or more air outlets via one or more slots that extend through the body oriented orthogonal to the fiber conveyance pathway.

11. The system of claim 10, wherein the air flowing out of the one or more openings has an average velocity of bout 50 m/s to about 350 m/s.

12. The system of claim 10, wherein the opening has a diameter of about 2 mm to about 100 mm.

13. The system of claim 10, wherein the one or more air outlets is a plurality of nozzles.

14. The system of claim 13, wherein each of the plurality of nozzles has a diameter of about 100 micron to about 5 mm.

15. The system of claim 13, wherein the one or more air outlets is a singular slot having a width of about 50 microns to about 2 mm.

16. The system of claim 10, wherein each body is positioned a distance of about 2 inches to about 10 inches apart from an adjacent body.

17. The system of claim 10, wherein the one or more air outlets are configured to direct the air from the one or more air outlets in a direction orthogonal to the fiber conveyance pathway.

18. A method for cooling an optical fiber, the method comprising:
   drawing an optical fiber through a draw furnace; and
   conveying the optical fiber through a cooling device, the cooling device having a first inlet and a first outlet positioned opposite the first inlet, the optical fiber entering the first cooling device at the first inlet and exiting the first cooling device at the first outlet, the optical fiber having a first temperature at the first inlet, and a second temperature at the first outlet that is lower than the first temperature, wherein the cooling device comprises:
      a plurality of bodies, each body having a top surface and an opposing bottom surface,
      an opening within each of the plurality of bodies extending from the top surface through the body to the bottom surface, wherein the opening is configured to pass the optical fiber through the body along a fiber conveyance pathway,
      one or more air inlets within the body, and
      one or more air outlets within the body configured to direct air to contact the optical fiber as it passes through the opening, wherein the air flowing out of the one or more openings has an average velocity of about 20 m/s to 350 m/s, and wherein the one or more air inlets are fluidly coupled to the one or more air outlets via one or more slots that extend through the body oriented orthogonal to the fiber conveyance pathway.

19. The method for cooling an optical fiber of claim 18, wherein the air flowing out of the one or more openings has an average velocity of about 50 m/s to about 350 m/s.

20. The method for cooling an optical fiber of claim 18, wherein the one or more air outlets are configured to direct the air from the one or more air outlets in a direction orthogonal to the fiber conveyance pathway.

* * * * *